Sept. 17, 1968  B. F. DELANEY  3,401,846
SEEDER WITH DISCHARGE ASSISTANT HAVING
DISCHARGE VOLUME VARYING MEANS
Filed March 13, 1967 2 Sheets-Sheet 1
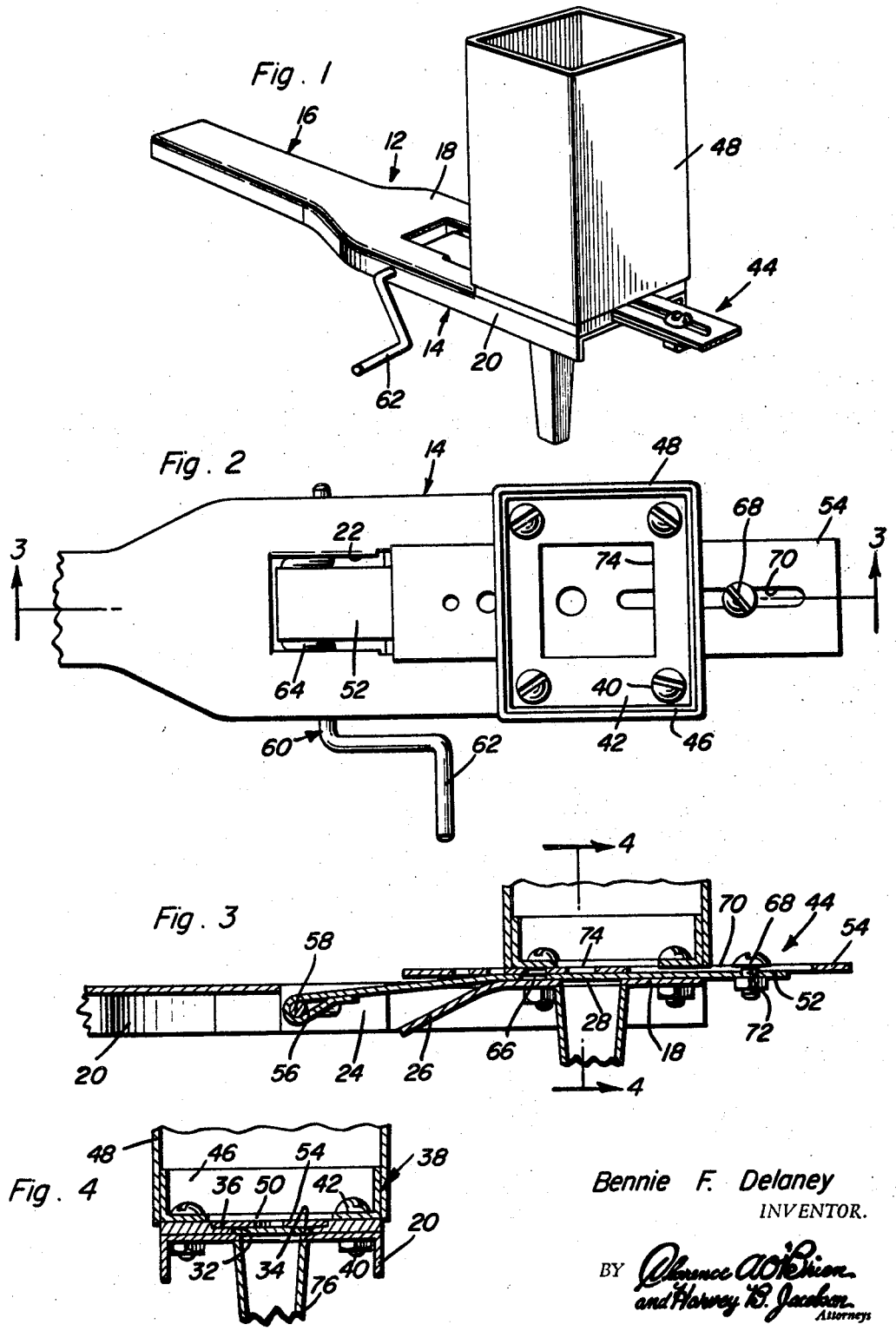
Bennie F. Delaney
INVENTOR.

Sept. 17, 1968　　　　　　B. F. DELANEY　　　　　3,401,846
　　　　　SEEDER WITH DISCHARGE ASSISTANT HAVING
　　　　　　DISCHARGE VOLUME VARYING MEANS
Filed March 13, 1967　　　　　　　　　　　2 Sheets-Sheet 2
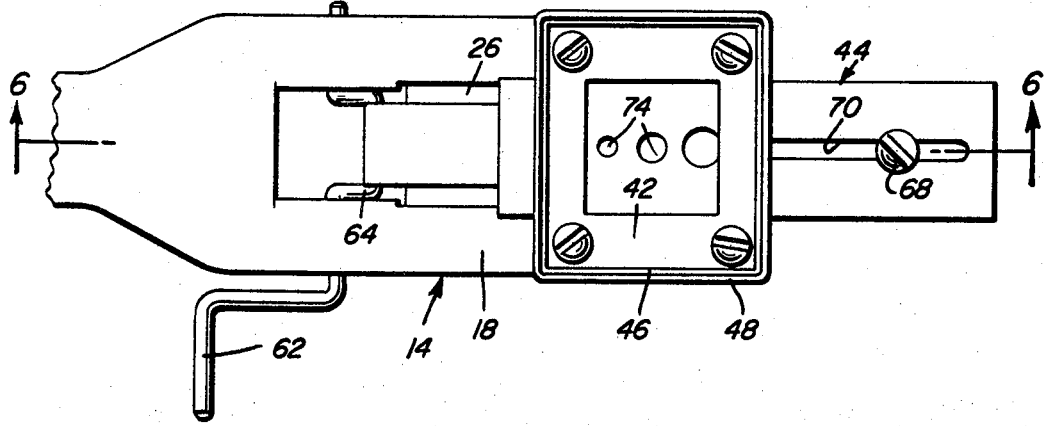
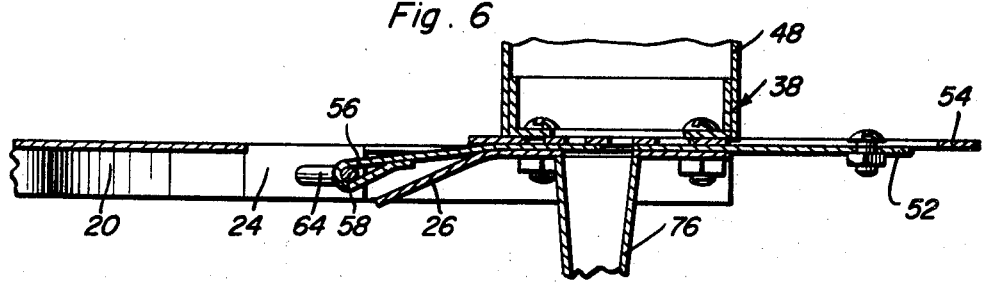
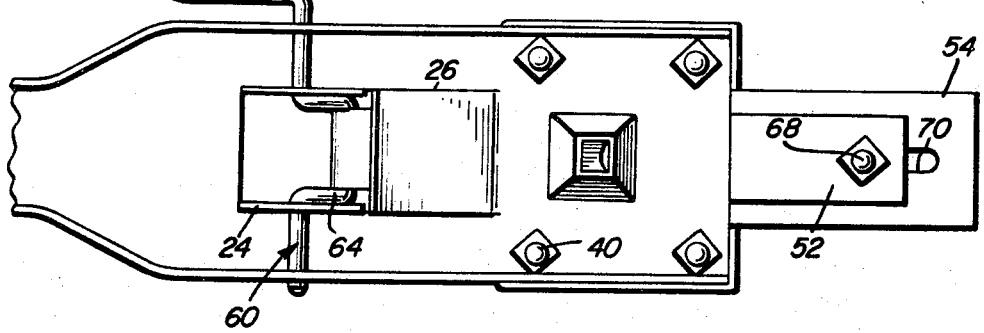
Bennie F. Delaney
INVENTOR.

United States Patent Office 3,401,846
Patented Sept. 17, 1968

3,401,846
SEEDER WITH DISCHARGE ASSISTANT HAVING
DISCHARGE VOLUME VARYING MEANS
Bennie F. Delaney, Rte. 2, Box 42,
Rusk, Tex. 75785
Filed Mar. 13, 1967, Ser. No. 622,711
5 Claims. (Cl. 222—282)

ABSTRACT OF THE DISCLOSURE

A hand held and manipulated seeder wherein an even discharge of seed in predetermined amounts is effected through a continuous reciprocation of a flow discharge regulating member between a seed containing hopper and a discharge spout. The reciprocation of the discharge regulating member is effected through a continuous rotational driving of a shaft which incorporates a crank for a translation of the rotation of the shaft into a reciprocal driving of the discharge regulating member.

---

The instant invention is generally concerned with seeders, and is more particularly concerned with the provision of a hand held and hand manipulated seeder particularly adapted for use in connection with vegetable, flower and other seeds of a relatively small size.

It is a primary object of the instant invention to provide a seeder which can be manipulated in a simple manner so as to effect a consistent discharge of predetermined amounts of seed.

In connection with the above object, it is also a significant object of the instant invention to provide a seeder wherein the rate or degree of discharge can be regulated so as to accommodate both variations in the size of the seed and different density patterns which might be desired.

Also, it is an important object of the instant invention to provide a seeder wherein a self-contained supply of seed can be incorporated directly thereinto for subsequent discharge at the desired rate.

Furthermore, it is an important object of the instant invention to provide a seeder which, while unique in construction, is of a relatively simple, economical and trouble-free nature capable of being easily cleaned and otherwise maintained.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the seeder of the instant invention;

FIGURE 2 is an enlarged partial top plan view of the seeder;

FIGURE 3 is a partial cross-sectional view taken substantially on a plane passing along line 3—3 in FIGURE 2;

FIGURE 4 is a partial cross-sectional view taken substantially on a plane passing along line 4—4 in FIGURE 3;

FIGURE 5 is a top plan view similar to FIGURE 2 with the discharge member in a forward or discharging position;

FIGURE 6 is a partial cross-sectional view taken substantially on a plane passing along line 6—6 in FIGURE 5; and FIGURE 7 is a partial bottom plan view of the seeder.

Referring now more specifically to the drawings, reference numeral 10 is used to generally designate the seeder comprising the instant invention. The seeder 10 includes a main support or base member 12 which includes an elongated head portion 14 at one end thereof and an elongated handle or handle portion 16 projecting longitudinally from one end of the head portion. The handle 16 is narrower than the head portion 14 so as to provide a convenient portion which can be easily grasped or held in the hand of a user of the seeder 10.

The member 12 itself is defined by a flat top panel 18 continuous along the full length thereof and a pair of opposed depending side flanges 20, also extending along the full length of the member 12 so as to effect a rigidification thereof.

The head portion 14 is provided with a centrally located longitudinally extending relatively wide slot 22 therethrough. The rear portion of the slot 22, that closest to the narrower handle portion 16, has been defined by downwardly folding two opposed tabs which, in their vertical depending position, define a pair of opposed mounting ears 24, the use of which shall be explained presently. The forward portion of the slot 22 is defined by a downwardly folded rearwardly inclined panel 26, forming in effect an enlarged mouth or smooth transition area from below to above the top panel 18. Finally, just forward of the elongated slot 22 in the head portion 14, the top plate 18 is provided with an enlarged aperture 28 vertically therethrough, this aperture 28 of course being on the longitudinal center line of the slot 22.

Provided longitudinally along the opposed edge portions of the top panel 18 from the forward end of the slot 22 to the front end of the head portion 14 is a pair of opposed guide or spacing blocks 30. Each of the blocks 30 includes a straight inner edge 32 spaced outwardly from the adjoining side of the plate aperture or opening 28 so as to define a seating portion 34 adjacent thereto. In addition, each of these inner edges 32 has the upper portion thereof offset so as to define a second seating portion or shoulder 36. An enlarged rectangular hopper mount 38 is positioned directly over the opposed blocks 30 and rigidly affixed to the elongated head portion 14 by bolt and nut means 40 engaged through the base plate 42 of the hopper mount 38, the spacing blocks 30 located immediately therebelow, and the subjacent head portion part of the top panel 18. Inasmuch as the hopper mount 38 is positioned vertically above the top panel 18 by the opposed spacing blocks 30, it will be appreciated that a longitudinal passage is provided centrally therebetween in alignment with the longitudinal slot 22. This passage accommodates the discharge regulating member 44 which shall be described presently. The hopper mount 38 itself includes upstanding integral peripheral walls 46 which are received within and secure the lower end portion of a vertically elongated seed receiving hopper 48. It will of course be appreciated that the cross-section of the hopper corresponds to that of the hopper mount 38, this in the illustrated example being rectangular. Further, in order to allow for a free flow of the seed from the hopper 48 through the plate aperture 28, it will be appreciated that the base plate or panel 42 of the hopper mount 38 includes a centrally located enlarged opening 50 therethrough.

The discharge regulating member 44 consists of lower and upper elongated cooperating plates 52 and 54, the lower plate 52 constituting a slide and the upper plate 54 constituting a flow adjusting or regulating plate. The slide or slide plate 52 is of a width so as to be snugly received between the elongated parallel inner edges 32 of the guide or spacing blocks 30, and at the same time slidably seat on the edge defined shoulders 34 directly on the upper surface of the top panel 18 for longitudinal sliding movement across the discharge opening 28. The slide 52 is of a length so as to project from a point substantially forward of the front end of the elongated head portion 14 rearwardly and centrally along the head portion 14 and through the elongated slot 22. The rear end portion of the slide 52 is reversely bent so as to define a closed loop 56 which in turn receives, transversely therethrough, the crank portion 58 of an elongated control rod or shaft 60. This control rod 60 has the aligned opposite end portions thereof, outward of the crank portion 58, rotatably received through both the mounting ears 24 which define the opposed sides of the rear portion of the slot 22, and the opposed rigidifying flanges 20 defining the opposite edges of the main support member 12. In order to effect the rotation of the control shaft 60, an easily held crank handle 62 is provided integrally at one end thereof, this handle 62 being located laterally of the enlarged head portion 14 for easy grasping by one hand, while the other hand holds the handle 16 for a stabilizing and positioning of the seeder 10. It will of course be appreciated that as the shaft 60 is rotated through a movement of the handle portion 62, the crank portion 58 thereof will translate the rotational movement of the shaft 60 to a longitudinal reciprocation of the slide or slide plate 52. Further, the shaft 60 is stabilized and properly retained in position by means of the mounting ears 24 which confine the parallel legs 64 of the crank portion 58 and prevent a lateral displacement of the shaft 60 while at the same time allowing for a free rotational movement thereof.

In order to allow for a selective movement of the seed from the hopper 48 through the top panel opening 28, a single aperture 66 is provided through the slide 52 and so located as to be moved selectively between two extreme positions, one retracted rearwardly completely away from the top panel opening 28 as illustrated in FIGURE 3, and the second forward position wherein the slide opening 66 is in vertical overlying relation to the opening 28 as illustrated in FIGURE 6. These two positions represent the extreme positions of the crank portion 58 of the shaft 60 as will be readily appreciated. Further, inasmuch as the slide 52 must necessarily pass from below the top panel 18 to overlying relation to the top panel 18, it will be appreciated that a slight degree of flexibility is inherent therein with this movement from below to above the panel 18 being further facilitated by the rearwardly angled panel 26 which defines the forward portion of the slot 22.

The flow adjusting or regulating plate 54 is provided so as to cooperate with the slide 52 in enabling a variation of the amount of seed discharged through the opening 28. As such, the plate 54 is selectively bolted in parallel overlying relation directly to the slide 52 by means of a nut and bolt assembly 68 engaged through an elongated slot 70 centrally along the forward portion of the plate 54, and an aligned bolthole 72 located in the forward portion of the slide 52. The slot 70 is of a length so as to enable a selective alignment of any one of a plurality of centrally aligned openings or apertures 74 in the plate 54 with the single discharge opening 66 in the plate 52. These openings 74 are of varying sizes which, when aligned with the opening 66 in the slide 52, effectively restrict the combined passage through the two plates 52 and 54 to the size of the particular opening 74 being utilized. Once the proper opening 74 is aligned with the opening 66, the bolt and nut unit 68 is locked, thereby integrally clamping the plates 52 and 54 to each other for a common manipulation thereof through the control shaft 60. Noting FIGURE 4, it will be appreciated that the flow adjusting plate 54 is actually wider than the slide plate 52 and is slidably received on the opposed longitudinal shoulders 36, thereby providing a support therefor which cooperates with the supporting seats 34 of the slide plate 52 so as to provide for a smooth sliding movement of the entire discharge regulating member 44. It is of course contemplated that the combined height of the plates 52 and 54 be such so as to be substantially equal to the height of the guide or spacing blocks 30 so as to fill the entire passage defined between the hopper mount 38 and top panel 18 so as to limit the discharge of seed solely through the selectively aligned apertures or openings as the crank handle 62 is rotated.

In order to guide and positively direct the discharging seed, an elongated depending spout 76 has the upper end thereof fixed peripherally about the top panel opening 28, this spout tapering downwardly so as to terminate in a lower discharge end, which while relatively small as compared to the affixed upper end thereof, is still of a size so as to allow for the smooth flow of the seed therethrough.

From the foregoing, it will be appreciated that a unique seeder has been defined. This seeder is capable of being hand held and manipulated at the option of the operator for the effecting of either a continuous or a periodic discharge of seed. The actual discharge of the seed is effected by a reciprocally driven discharge member which can in itself be adjusted so as to affect either or both the size and amount of seed being discharged during its manipulation. In the actual operation of the device, the appropriate opening in the flow regulating plate 54 is aligned with the single discharge opening 66 in the slide, the two plates are then locked together, the discharge spout orientated over the prepared bed or soil, and the handle 62 rotated so as to effect the reciprocal driving of the discharge member 44. While not specifically illustrated, it will of course be appreciated that the hopper 48 can be provided with a suitable lid or cover. Further, due to the simplicity of the construction, notwithstanding the uniqueness thereof, once the seeding operation is completed, the entire seeder can be quickly cleaned, and in fact, if deemed necessary, substantially completely dismantled for facilitating a further cleaning thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A hand held and manipulable seeder comprising a support panel, said support panel including an elongated head portion having a handle portion projecting longitudinally therefrom, said support panel including upper and lower surfaces, a seed passing aperture defined through said head portion, a seed hopper mounted on said upper surface in surrounding relation to said seed passing aperture, a seed discharging spout mounted in depending relation from said lower surface in surrounding relation to said aperture, an apertured seed flow regulating member overlying said panel and underlying said hopper, said seed flow regulating member projecting outwardly from said hopper toward said handle portion and generally parallel to said panel, and control means for effecting a reciprocal movement of said member for a selective seed discharge alignment of the member and panel apertures, said head portion having an elongated slot defined therein parallel with said seed flow regulating member, and a pair of depending ears rigid with said panel and paralleling each other along opposed edges of said slot, said control means comprising an elongated shaft positioned transversely across said panel, said shaft comprising an intermediate crank portion confined between said ears, said shaft, to each side of said intermediate crank portion, being rotatably mounted within said ears, said crank portion being rotatably engaged with the projecting end of said seed flow regulating member for effecting a reciprocal movement of said member in response to a rotation of said shaft, said slot freely receiving said member therethrough for engagement with the shaft crank portion mounted therebelow, said hopper and said panel cooperating in retaining said seed flow regulating member for said reciprocal movement.

2. The seeder of claim 1 wherein said panel includes a downwardly inclined portion extending below said panel at said slot so as to define a smooth transition area over which said member passes as it extends through said slot for engagement with the shaft.

3. The seeder of claim 2 wherein said member comprises a lower slide plate and an upward overlying flow adjusting plate, said slide plate having a single hole therethrough, said adjusting plate having a plurality of holes defined therethrough, said adjusting plate being movable relative to said slide plate for a selective alignment of any one of the plurality of holes with the one slide plate hole, the aligned holes constituting the seed flow regulating member aperture, and means for selectively locking said plates together with the slide plate hole aligned with a selected one of the adjusting plate holes.

4. The seeder of claim 3 including a pair of laterally spaced blocks mounted on the upper surface of the head portion of the panel on opposite sides of the seed passing aperture in the head portion, said hopper being received on said blocks, said blocks defining a longitudinal passage therebetween for the sliding reception of said member between the hopper and the upper surface of the panel, the facing edges of said opposed blocks defining vertically spaced seats for the sliding reception of the opposed edge portions of both the slide plate and the flow adjusting plate of the flow regulating member.

5. The seeder of claim 4 wherein the means for selectively locking the slide plate and the adjusting plate together comprises an elongated slot in said adjusting plate longitudinally aligned over a bolt receiving hole in said slide plate, and bolt means extending through said slot and bolt hole.

References Cited
UNITED STATES PATENTS

| | | | |
|---|---|---|---|
| 283,347 | 8/1883 | Jarvis | 222—361 X |
| 493,146 | 3/1893 | Bender | 222—361 X |
| 861,245 | 7/1907 | Armstrong | 221—274 |
| 921,185 | 5/1909 | Van Dyke | 221—274 X |
| 1,270,510 | 6/1918 | Goodman | 222—324 |
| 1,200,866 | 10/1916 | Ramsay | 222—310 X |
| 1,582,963 | 5/1926 | Boomershine | 221—274 X |
| 1,863,288 | 6/1932 | Sproles | 222—361 X |
| 1,916,781 | 7/1933 | Blatchford | 222—323 X |
| 2,761,588 | 9/1956 | Shields | 222—361 X |

SAMUEL F. COLEMAN, *Primary Examiner.*